United States Patent
Qiu et al.

(10) Patent No.: US 12,532,362 B2
(45) Date of Patent: Jan. 20, 2026

(54) SYSTEMS AND METHODS FOR REPORTING RANDOM ACCESS INFORMATION IN WIRELESS COMMUNICATION NETWORKS

(71) Applicant: ZTE CORPORATION, Guangdong (CN)

(72) Inventors: Zhihong Qiu, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 396 days.

(21) Appl. No.: 17/960,256

(22) Filed: Oct. 5, 2022

(65) Prior Publication Data
US 2023/0077603 A1     Mar. 16, 2023

Related U.S. Application Data

(63) Continuation of application No. PCT/CN2020/083899, filed on Apr. 9, 2020.

(51) Int. Cl.
*H04W 74/0833* (2024.01)
*H04W 74/08* (2024.01)
(Continued)

(52) U.S. Cl.
CPC ... *H04W 74/0841* (2013.01); *H04W 74/0833* (2013.01); *H04W 74/0875* (2013.01);
(Continued)

(58) Field of Classification Search
CPC ......... H04W 74/0841; H04W 74/0875; H04W 76/20; H04W 74/0836; H04W 74/0838;
(Continued)

(56) References Cited

U.S. PATENT DOCUMENTS

2019/0373450 A1* 12/2019 Zhou ............... H04L 5/0091
2022/0295361 A1* 9/2022 Naseer-Ul-Islam ............
                                                    H04W 36/0058
2024/0056986 A1* 2/2024 Jeon ............... H04W 76/00

FOREIGN PATENT DOCUMENTS

CN     108886721 A     11/2018
CN     110959304 A     4/2020
(Continued)

OTHER PUBLICATIONS

Machine translated version of KR-20210125364-A retrieved from PE2E on Nov. 23, 2024 (Year: 2020).*
(Continued)

*Primary Examiner* — Charles C Jiang
*Assistant Examiner* — Rachel Elizabeth Marks
(74) *Attorney, Agent, or Firm* — Foley & Lardner LLP

(57) ABSTRACT

Systems and methods for storing and transmitting random access (RA) information related to one or more RA procedures is discussed herein. In one embodiment, the systems and methods are configured to storing, by a wireless communication device, RA information of multiple sets of RA resource of a completed RA procedure. The method further includes receiving, by the wireless communication device from a wireless communication node, an indicator via a radio resource control (RRC) message. The method also includes transmitting, by the wireless communication device to the wireless communication node, responsive to the indicator, the RA information of the multiple sets of RA resource of the completed RA procedure.

20 Claims, 29 Drawing Sheets

(51) Int. Cl.
*H04W 74/0836* (2024.01)
*H04W 74/0838* (2024.01)
*H04W 76/20* (2018.01)

(52) U.S. Cl.
CPC ........ *H04W 76/20* (2018.02); *H04W 74/0836* (2024.01); *H04W 74/0838* (2024.01)

(58) Field of Classification Search
CPC ............ H04W 24/10; H04W 74/0833; H04W 74/004
See application file for complete search history.

(56) References Cited

FOREIGN PATENT DOCUMENTS

| KR | 20210125364 A | * | 10/2021 | ............ H04W 76/27 |
|----|---------------|---|---------|-------------------------|
| WO | WO-2019/051177 A1 | | 3/2019 | |
| WO | WO-2020/030501 A1 | | 2/2020 | |

OTHER PUBLICATIONS

Machine translated version of KR-20210125364-A retrieved from PE2E on May 10, 2025 (Year: 2020).*
CR for introducing MDT and SON, 3GPP TSG-RAN WG2 Meeting #109-e, R2-2002003, Mar. 10, 2020 (Year: 2020).*
Machine translated to English KR 20210125364 A; retrieved from PE2E on Sep. 20, 2025 (Year: 2021).*
Ericsson: "Feature summary for SON contributions in AI 6.12.4" TDoc R2-2002025, 3GPP TSG-RAN WG2 #109-e; Electronic meeting; Mar. 6, 2020 (18 pages).
Ericsson: "Open issues associated to RA report and RLF report" TDoc R2-2001116, 3GPP TSG-RAN WG2 #109-e; Electronic meeting; Mar. 6, 2020 (3 pages).
International Search Report and Written Opinion for PCT Appl. No. PCT/CN2020/083899 mailed Dec. 30, 2020 (8 pages).
Extended European Search Report on EP Appl No. 20896692.9, dated Apr. 12, 2023 (12 pages).
Huawei et al., "CR for introducing MDT and SON", 3GPP Draft; R2-2002003, 3GPP TSG-RAN WG2 Meeting #109-e, Electronic meeting; Mar. 11, 2020, (577 pages).
First Office Action for CN Appl. No. 202080099564.9 dated Apr. 22, 2025 (With English Translation 30 pages).
Qualcomm, "Summary of open issues on UE assistance" R2-2002025, 3GPP tsg_ran\wg2_rl2, tsgr2_109_e, Electronic meeting; Feb. 20, 2020 (17 pages).
TDIA, CATT, "Addition of testcase for NB-IoT / RACH Procedure / Contention free random access (CFRA)" R5-183198, 3GPP tsg_ran\wg5_test_ex-t1,tsgr5_79_busan, Electronic meeting; May 24, 2018 (6 pages).

* cited by examiner

```
-- ASN1START

-- TAG-UEINFORMATIONRESPONSE-START

UEInformationResponse-r16    ::=      SEQUENCE {
    rrc-TransactionIdentifier         RRC-TransactionIdentifier,
    criticalExtensions                CHOICE {
        ueInformationResponse-r16         UEInformationResponse-r16-IEs,
        criticalExtensionsFuture          SEQUENCE {}
    }
}

UEInformationResponse-r16-IEs ::=     SEQUENCE {
    logMeasReport-r16                 LogMeasReport-r16        OPTIONAL,
    connEstFailReport-r16             ConnEstFailReport-r16    OPTIONAL,
    ra-ReportList-r16                 RA-ReportList-r16        OPTIONAL,
    rlf-Report-r16                    RLF-Report-r16           OPTIONAL,
    mobilityHistoryReport-r16         MobilityHistoryReport-r16 OPTIONAL,
    nonCriticalExtension              SEQUENCE {}              OPTIONAL
}
```

FIG. 4A

```
LogMeasReport-r16 ::=           SEQUENCE {
    absoluteTimeStamp-r16           AbsoluteTimeInfo-r16,
    traceReference-r16              TraceReference-r16,
    traceRecordingSessionRef-r16    OCTET STRING (SIZE (2)),
    tce-Id-r16                      OCTET STRING (SIZE (1)),
    logMeasInfoList-r16             LogMeasInfoList-r16,
    logMeasAvailable-r16            ENUMERATED {true} OPTIONAL,
    logMeasAvailableBT-r16          ENUMERATED {true} OPTIONAL,
    logMeasAvailableWLAN-r16        ENUMERATED {true} OPTIONAL,
    ...
}

LogMeasInfoList-r16 ::= SEQUENCE (SIZE (1..maxLogMeasReport-r16)) OF LogMeasInfo-r16

LogMeasInfo-r16 ::=     SEQUENCE {
    locationInfo-r16            LocationInfo-r16        OPTIONAL,
    relativeTimeStamp-r16       INTEGER (0..7200),
    servCellIdentity-r16        CGI-Info-Logging-r16,
    measResultServingCell-r16   MeasResultServingCell-r16 OPTIONAL,
```

FIG. 4B

```
    measResultNeighCells-r16         SEQUENCE {
       measResultNeighCellListNR   MeasResultListLogging2NR-r16
OPTIONAL,
       measResultNeighCellListEUTRA  MeasResultList2EUTRA-r16
OPTIONAL
    },
    anyCellSelectionDetected-r16    ENUMERATED {true}    OPTIONAL
}

ConnEstFailReport-r16 ::=           SEQUENCE {
    measResultFailedCell-r16           MeasResultFailedCell-r16,
    locationInfo-r16                LocationInfo-r16
OPTIONAL,
    measResultNeighCells-r16        SEQUENCE {
       measResultNeighCellListNR   MeasResultList2NR-r16
OPTIONAL,
       measResultNeighCellListEUTRA  MeasResultList2EUTRA-r16
PTIONAL
    },
    numberOfConnFail-r16     INTEGER (0..7),
    perRAInfoList-r16           PerRAInfoList-r16     OPTIONAL,
```

FIG. 4C

```
        timeSinceFailure-r16            TimeSinceFailure-r16,

...

}

MeasResultServingCell-r16 ::= SEQUENCE { physCellId                          PhysCellId OPTIONAL, resultsSSB-Cell                     MeasQuantityResults OPTIONAL, resultsSSB                                      SEQUENCE{ best-ssb-Index          SSB-Index, best-ssb-Results        MeasQuantityResults OPTIONAL, numberOfGoodSSB         INTEGER(1..maxNrofSSBs) OPTIONAL

}       OPTIONAL,

...

}

MeasResultFailedCell-r16 ::= SEQUENCE { cgi-Info                        CGI-Info-Logging-r16, physCellId-r16                 PhysCellId              OPTIONAL, measResult-r16                                  SEQUENCE { cellResults-r16                             SEQUENCE{ resultsSSB-Cell-r16     MeasQuantityResults OPTIONAL
```

FIG. 4D

```
        },
        rsIndexResults-r16                      SEQUENCE{
            resultsSSB-Indexes-r16      ResultsPerSSB-IndexList
OPTIONAL
        }                                                OPTIONAL
    }
}

RA-ReportList-r16 ::= SEQUENCE (SIZE (1..maxRAReport)) OF RA-
Report-r16

RA-Report-r16 ::=            SEQUENCE {
    cellId-r16              CGI-Info-LoggingDetailed-r16,
    absoluteFrequencyPointA-r16     ARFCN-ValueNR,
    locationAndBandwidth-r16                 INTEGER (0..37949),
    subcarrierSpacing-r16                    SubcarrierSpacing,
    ra-ResourceList-r16                      RA-ResourceList-r16
    raPurpose-r16           ENUMERATED       {accessRelated,
beamFailureRecovery, reconfigurationWithSync, ulUnSynchronized,
```

FIG. 4E schedulingRequestFailure, noPUCCHResourceAvailable, sCellAdditionTAAdjestment, requestForOtherSI, spare8, spare7, spare6, spare5, spare4, spare3, spare2, spare1}, perRAInfoList-r16       PerRAInfoList-r16

}

*RA-ResourceList-r16 ::= SEQUENCE (SIZE (1..maxRAResource)) OF RA-Resource-r16*

*RA-Resource-r16 ::=    SEQUENCE {*

*ra-Resource-Index-r16   INTEGER (1...maxRAResource)*

*prach-FrequencyStart-r16                INTEGER (0..maxNrofPhysicalResourceBlocks-1),*

*prach-SubcarrierSpacing-r16     SubcarrierSpacing,*

*prach-FDM-r16               ENUMERATED {one, two, four, eight},*

}

PerRAInfoList-r16 ::= SEQUENCE (SIZE (1..200)) OF PerRAInfo-r16

PerRAInfo-r16 ::=    CHOICE { perRASSBInfoList-r16      PerRASSBInfo-r16, perRACSI-RSInfoList-r16      PerRACSI-RSInfo-r16

```
PerRASSBInfo-r16 ::= SEQUENCE {
    ssb-Index-r16                          SSB-Index,
    numberOfPreamblesSentOnSSB-r16         INTEGER (1..200),
    perRAAttemptInfoList-r16               PerRAAttemptInfoList-r16
    ra-Resource-Index-r16                  INTEGER (1...maxRAResource)
}

PerRACSI-RSInfo-r16 ::= SEQUENCE {
    csi-RS-Index-r16                       CSI-RS-Index,
    numberOfPreamblesSentOnCSI-RS-r16      INTEGER (1..200),
    perRAAttemptInfoList-r16               PerRAAttemptInfoList-r16
    ra-Resource-Index-r16                  INTEGER (1...maxRAResource)
}

PerRAAttemptInfoList-r16 ::=   SEQUENCE   (SIZE   (1..200))   OF
PerRAAttemptInfo-r16

PerRAAttemptInfo-r16 ::=               SEQUENCE {
    contentionDetected-r16         BOOLEAN,
    dlRSRPAboveThreshold-r16       BOOLEAN,
```

RLF-Report-r16  ::=              CHOICE {
    nr-RLF-Report-r16                SEQUENCE {
        measResultLastServCell-r16       MeasResultRLFNR-r16,
        measResultNeighCells-r16         SEQUENCE {
            measResultListNR-r16             MeasResultList2NR-r16
    OPTIONAL,
            measResultListEUTRA-r16          MeasResultList2EUTRA-r16
        OPTIONAL
        }
    OPTIONAL,
        c-RNTI-r16                  RNTI-Value,
        previousPCellId-r16              CGI-Info-
LoggingDetailed-r16               OPTIONAL,
        failedPCellId-r16                CHOICE {
            cellGlobalId-r16                 CGI-Info-LoggingDetailed-
r16,
            pci-arfcn-r16                    SEQUENCE {
                physCellId-r16                   PhysCellId,
```

FIG. 4H

```
        carrierFreq-r16             ARFCN-ValueNR
    }
}                                               OPTIONAL,
   reestablishmentCellId-r16   CGI-Info-Logging-r16
OPTIONAL,
   timeConnFailure-r16        INTEGER (0..1023)
OPTIONAL,
   timeSinceFailure-r16       TimeSinceFailure-r16,
   connectionFailureType-r16  ENUMERATED {rlf, hof}
OPTIONAL,
   rlf-Cause-r16              ENUMERATED {
                              t310-Expiry, randomAccessProblem,
                              rlc-MaxNumRetx,
beamFailureRecoveryFailure, spare4, spare3, spare2, spare1},
   locationInfo-r16           LocationInfo-r16
OPTIONAL,
   absoluteFrequencyPointA-r16   ARFCN-ValueNR
OPTIONAL,
   locationAndBandwidth-r16              INTEGER (0..37949)
   OPTIONAL,
```

FIG. 4I

```
        subcarrierSpacing-r16                    SubcarrierSpacing
    OPTIONAL,
        ra-ResourceList-r16                      RA-ResourceList-r16 OPTIONAL,
        perRAInfoList-r16                        PerRAInfoList-r16
    OPTIONAL,
        noSuitableCellFound-r16                  ENUMERATED {true}
    OPTIONAL
    },
    eutra-RLF-Report-r16                         SEQUENCE {
        failedPCellId-EUTRA                      CGI-InfoEUTRALogging,
        measResult-RLF-Report-EUTRA-r16          OCTET STRING
    }
}

MeasResultList2NR-r16 ::=                        SEQUENCE(SIZE (1..maxFreq)) OF
MeasResult2NR-r16

MeasResultList2EUTRA-r16 ::=                     SEQUENCE(SIZE (1..maxFreq))
OF MeasResult2EUTRA-r16

MeasResult2NR-r16 ::=                            SEQUENCE {
```

FIG. 4J

```
    ssbFrequency-r16           ARFCN-ValueNR
OPTIONAL,
    refFreqCSI-RS-r16          ARFCN-ValueNR
OPTIONAL,
    measResultList-r16                  MeasResultListNR
}

MeasResultListLogging2NR-r16 ::=        SEQUENCE(SIZE
(1..maxFreq)) OF MeasResultListLoggingNR-r16
MeasResultListLoggingNR-r16 ::=             SEQUENCE (SIZE
(1..maxCellReport)) OF MeasResultLoggingNR-r16

MeasResultLoggingNR-r16 ::=                         SEQUENCE {
    physCellId-r16                      PhysCellId,
    resultsSSB-Cell-r16             MeasQuantityResults,
    numberOfGoodSSB-r16        INTEGER   (1..maxNrofSSBs)
    OPTIONAL
}

MeasResult2EUTRA-r16 ::=        SEQUENCE {
    carrierFreq-r16            ARFCN-ValueEUTRA,
```

FIG. 4K

```
    measResultList-r16                      MeasResultListEUTRA
}

MeasResultRLFNR-r16 ::=                     SEQUENCE {
    measResult-r16                          SEQUENCE {
        cellResults-r16                         SEQUENCE{
            resultsSSB-Cell-r16
MeasQuantityResults                     OPTIONAL,
            resultsCSI-RS-Cell-r16
MeasQuantityResults                     OPTIONAL
        },
        rsIndexResults-r16                      SEQUENCE{
            resultsSSB-Indexes-r16                  ResultsPerSSB-
IndexList           OPTIONAL,
            ssbRLMConfigBitmap-r16                          BIT STRING
(SIZE (64))         OPTIONAL,
            resultsCSI-RS-Indexes-r16
ResultsPerCSI-RS-IndexList              OPTIONAL,
            csi-rsRLMConfigBitmap-r16                       BIT STRING
(SIZE (96))         OPTIONAL
        }                                                   OPTIONAL
```

TimeSinceFailure-r16 ::=           INTEGER (0..172800)

MobilityHistoryReport-r16 ::=VisitedCellInfoList-r16

-- TAG-UEINFORMATIONRESPONSE-STOP

-- ASN1STOP
```

FIG. 4M

```
-- ASN1START

-- TAG-MULTIPLICITY-AND-TYPE-CONSTRAINT-DEFINITIONS-START maxRAResource   INTEGER ::= 3      -- Maximum number of RA resource
information to be included in the RA resource List

-- TAG-MULTIPLICITY-AND-TYPE-CONSTRAINT-DEFINITIONS-STOP

-- ASN1STOP
```

FIG. 5

*UEInformationResponse message*

```
-- ASN1START

-- TAG-UEINFORMATIONRESPONSE-START

UEInformationResponse-r16 ::=          SEQUENCE {
    rrc-TransactionIdentifier          RRC-TransactionIdentifier,
    criticalExtensions                 CHOICE {
        ueInformationResponse-r16          UEInformationResponse-r16-IEs,
        criticalExtensionsFuture           SEQUENCE {}
    }
}

UEInformationResponse-r16-IEs ::=    SEQUENCE {
    measResultIdleEUTRA-r16      MeasResultIdleEUTRA-r16    OPTIONAL,
    measResultIdleNR-r16         MeasResultIdleNR-r16       OPTIONAL,
    logMeasReport-r16            LogMeasReport-r16          OPTIONAL,
    connEstFailReport-r16        ConnEstFailReport-r16      OPTIONAL,
    ra-ReportList-r16            RA-ReportList-r16          OPTIONAL,
    rlf-Report-r16               RLF-Report-r16             OPTIONAL,
    mobilityHistoryReport-r16    MobilityHistoryReport-r16  OPTIONAL,
```

FIG. 6A

```
    lateNonCriticalExtension          OCTET STRING  OPTIONAL, nonCriticalExtension                    SEQUENCE {}  OPTIONAL
}

LogMeasReport-r16 ::=                   SEQUENCE { absoluteTimeStamp-r16                   AbsoluteTimeInfo-r16, traceReference-r16                      TraceReference-r16, traceRecordingSessionRef-r16            OCTET STRING (SIZE (2)), tce-Id-r16                              OCTET STRING (SIZE (1)), logMeasInfoList-r16                     LogMeasInfoList-r16, logMeasAvailable-r16       ENUMERATED {true}  OPTIONAL, logMeasAvailableBT-r16     ENUMERATED {true}  OPTIONAL, logMeasAvailableWLAN-r16   ENUMERATED {true}  OPTIONAL,

...
}

LogMeasInfoList-r16 ::= SEQUENCE (SIZE (1..maxLogMeasReport-r16))
OF LogMeasInfo-r16

LogMeasInfo-r16 ::=                     SEQUENCE { locationInfo-r16                        LocationInfo-r16 OPTIONAL,
```

FIG. 6B

```
    relativeTimeStamp-r16            INTEGER (0..7200), servCellIdentity-r16             CGI-Info-Logging-r16, measResultServingCell-r16            MeasResultServingCell-
r16        OPTIONAL, measResultNeighCells-r16         SEQUENCE { measResultNeighCellListNR
MeasResultListLogging2NR-r16   OPTIONAL, measResultNeighCellListEUTRA      MeasResultList2EUTRA-
r16        OPTIONAL

}, anyCellSelectionDetected-r16   ENUMERATED {true}  OPTIONAL
}

ConnEstFailReport-r16 ::=           SEQUENCE { measResultFailedCell-r16            MeasResultFailedCell-r16, locationInfo-r16          LocationInfo-r16  OPTIONAL, measResultNeighCells-r16             SEQUENCE { measResultNeighCellListNR          MeasResultList2NR-r16
OPTIONAL, measResultNeighCellListEUTRA      MeasResultList2EUTRA-
r16        OPTIONAL
```

FIG. 6C

```
    },
    numberOfConnFail-r16          INTEGER (0..7),
    perRAInfoList-r16             PerRAInfoList-r16  OPTIONAL,
    timeSinceFailure-r16          TimeSinceFailure-r16,
    ...
}

MeasResultServingCell-r16 ::=    SEQUENCE {
    physCellId                       PhysCellId  OPTIONAL,
    resultsSSB-Cell                  MeasQuantityResults  OPTIONAL,
    resultsSSB                       SEQUENCE{
        best-ssb-Index                   SSB-Index,
        best-ssb-Results                 MeasQuantityResults  OPTIONAL,
        numberOfGoodSSB                  INTEGER (1..maxNrofSSBs-r16)
OPTIONAL
    }
OPTIONAL,
    ...
}

MeasResultFailedCell-r16 ::=     SEQUENCE {
```

FIG. 6D

```
        cgi-Info                          CGI-Info-Logging-r16,
        physCellId-r16                    PhysCellId   OPTIONAL,
        measResult-r16                    SEQUENCE {
            cellResults-r16                   SEQUENCE{
                resultsSSB-Cell-r16               MeasQuantityResults
OPTIONAL
            },
            rsIndexResults-r16                SEQUENCE{
                resultsSSB-Indexes-r16            ResultsPerSSB-
IndexList    OPTIONAL
            }
        }
    }

RA-ReportList-r16 ::= SEQUENCE (SIZE (1..maxRAReport-r16)) OF RA-
Report-r16

RA-Report-r16 ::=                     SEQUENCE {
    cellId-r16                        CGI-Info-LoggingDetailed-r16,
    absoluteFrequencyPointA-r16       ARFCN-ValueNR,
    locationAndBandwidth-r16          INTEGER (0..37949),
```

FIG. 6E

```
    subcarrierSpacing-r16              SubcarrierSpacing, ra-ResourceCommon-r16              RA-Resource-r16,      OPTIONAL ra-ResourceDedicated-r16                          RA-Resource-r16,
OPTIONAL raPurpose-r16                  ENUMERATED {accessRelated,
beamFailureRecovery, reconfigurationWithSync, ulUnSynchronized,
    schedulingRequestFailure,             noPUCCHResourceAvailable,
sCellAdditionTAAdjestment,
    requestForOtherSI, spare8, spare7, spare6, spare5, spare4,
spare3, spare2, spare1},
        perRAInfoList-r16              PerRAInfoList-r16
}

RA-Resource-r16 ::=                    SEQUENCE {
    msg1-FrequencyStart-r16                                INTEGER
(0..maxNrofPhysicalResourceBlocks-1),
    msg1-SubcarrierSpacing-r16         SubcarrierSpacing,
    msg1-FDM-r16                       ENUMERATED {one, two,
four, eight},
}
```

FIG. 6F

```
PerRAInfoList-r16 ::=   SEQUENCE (SIZE (1..200)) OF PerRAInfo-r16

PerRAInfo-r16  ::=                      CHOICE { perRASSBInfoList-r16                    PerRASSBInfo-r16, perRACSI-RSInfoList-r16                 PerRACSI-RSInfo-r16

}

PerRASSBInfo-r16 ::=                    SEQUENCE { ssb-Index-r16                           SSB-Index, numberOfPreamblesSentOnSSB-r16          INTEGER (1..200), perRAAttemptInfoList-r16                PerRAAttemptInfoList-r16

*ra-ResourceType-r16*                           *ENUMERATED {common,*

*dedicated,spare2, spare1}*              *OPTIONAL, -- Cond multiRA*

}

PerRACSI-RSInfo-r16 ::=                 SEQUENCE { csi-RS-Index-r16                        CSI-RS-Index, numberOfPreamblesSentOnCSI-RS-r16       INTEGER (1..200), perRAAttemptInfoList-r16                PerRAAttemptInfoList-r16

*ra-ResourceType-r16*                           *ENUMERATED {common,*

*dedicated,spare2, spare1}*              *OPTIONAL, -- Cond multiRA*
```

PerRAAttemptInfoList-r16  ::=          SEQUENCE (SIZE (1..200)) OF
PerRAAttemptInfo-r16

PerRAAttemptInfo-r16  ::=              SEQUENCE {
    contentionDetected-r16                 BOOLEAN,
    dlRSRPAboveThreshold-r16               BOOLEAN,
    ...
}

RLF-Report-r16  ::=                    CHOICE {
    nr-RLF-Report-r16                      SEQUENCE {
        measResultLastServCell-r16             MeasResultRLFNR-r16,
        measResultNeighCells-r16               SEQUENCE {
            measResultListNR-r16                   MeasResultList2NR-
r16        OPTIONAL,
            measResultListEUTRA-r16
MeasResultList2EUTRA-r16       OPTIONAL
        }
                                                                OPTIONAL,
        c-RNTI-r16                             RNTI-Value,
```

FIG. 6H

```
        previousPCellId-r16                              CGI-Info-
LoggingDetailed-r16    OPTIONAL, failedPCellId-r16                       CHOICE { cellGlobalId-r16                            CGI-Info-
LoggingDetailed-r16, pci-arfcn-r16                       SEQUENCE { physCellId-r16                          PhysCellId, carrierFreq-r16                         ARFCN-ValueNR

}

}                                       OPTIONAL, reestablishmentCellId-r16               CGI-Info-Logging-r16
OPTIONAL, timeConnFailure-r16                     INTEGER (0..1023)
OPTIONAL, timeSinceFailure-r16                    TimeSinceFailure-r16, connectionFailureType-r16               ENUMERATED {rlf, hof}
OPTIONAL, rlf-Cause-r16                           ENUMERATED {t310-
Expiry, randomAccessProblem, rlc-MaxNumRetx, beamFailureRecoveryFailure, spare4, spare3, spare2, spare1},
```

FIG. 6I

```
        locationInfo-r16                         LocationInfo-r16
OPTIONAL, absoluteFrequencyPointA-r16              ARFCN-ValueNR
OPTIONAL, locationAndBandwidth-r16                 INTEGER (0..37949)
OPTIONAL, subcarrierSpacing-r16                    SubcarrierSpacing
OPTIONAL, ra-ResourceCommon-r16                    RA-Resource-r16,
OPTIONAL ra-ResourceDedicated-r16                 RA-Resource-r16,
OPTIONAL perRAInfoList-r16                        PerRAInfoList-r16
OPTIONAL, noSuitableCellFound-r16                  ENUMERATED {true}
OPTIONAL },
    eutra-RLF-Report-r16                         SEQUENCE {
        failedPCellId-EUTRA                      CGI-InfoEUTRALogging,
        measResult-RLF-Report-EUTRA-r16          OCTET STRING
    }
```

MeasResultList2NR-r16  ::=              SEQUENCE(SIZE (1..maxFreq))
OF MeasResult2NR-r16

MeasResultList2EUTRA-r16  ::=           SEQUENCE(SIZE (1..maxFreq))
OF MeasResult2EUTRA-r16

MeasResult2NR-r16  ::=                  SEQUENCE {
    ssbFrequency-r16                        ARFCN-ValueNR    OPTIONAL,
    refFreqCSI-RS-r16                       ARFCN-ValueNR    OPTIONAL,
    measResultList-r16                      MeasResultListNR
}

MeasResultListLogging2NR-r16  ::=       SEQUENCE(SIZE (1..maxFreq))
OF MeasResultListLoggingNR-r16

MeasResultListLoggingNR-r16   ::=                SEQUENCE   (SIZE
(1..maxCellReport)) OF MeasResultLoggingNR-r16

MeasResultLoggingNR-r16  ::=            SEQUENCE {
    physCellId-r16                          PhysCellId,
    resultsSSB-Cell-r16                     MeasQuantityResults,
```

FIG. 6K

```
        numberOfGoodSSB-r16                  INTEGER (1..maxNrofSSBs-
r16) OPTIONAL
}

MeasResult2EUTRA-r16 ::=                 SEQUENCE {
    carrierFreq-r16                          ARFCN-ValueEUTRA,
    measResultList-r16                       MeasResultListEUTRA
}

MeasResultRLFNR-r16 ::=                  SEQUENCE {
    measResult-r16                           SEQUENCE {
        cellResults-r16                          SEQUENCE{
            resultsSSB-Cell-r16                      MeasQuantityResults
OPTIONAL,
            resultsCSI-RS-Cell-r16                   MeasQuantityResults
OPTIONAL
        },
        rsIndexResults-r16                       SEQUENCE{
            resultsSSB-Indexes-r16                   ResultsPerSSB-
IndexList    OPTIONAL,
            ssbRLMConfigBitmap-r16                   BIT STRING (SIZE
```

FIG. 6L

```
(64))    OPTIONAL,
        resultsCSI-RS-Indexes-r16         ResultsPerCSI-
RS-IndexList   OPTIONAL,
        csi-rsRLMConfigBitmap-r16         BIT STRING (SIZE
(96))    OPTIONAL
    }                                     OPTIONAL
   }
 }

TimeSinceFailure-r16 ::= INTEGER (0..172800)

MobilityHistoryReport-r16 ::= VisitedCellInfoList-r16

-- TAG-UEINFORMATIONRESPONSE-STOP

-- ASN1STOP
```

FIG. 6M

SYSTEMS AND METHODS FOR REPORTING RANDOM ACCESS INFORMATION IN WIRELESS COMMUNICATION NETWORKS

CROSS-REFERENCE TO RELATED APPLICATION

This application claims the benefit of priority under 35 U.S.C. § 120 as a continuation of PCT Patent Application No. PCT/CN2020/083899, filed on Apr. 9, 2020, the disclosure of which is incorporated herein by reference in its entirety.

TECHNICAL FIELD

The disclosure relates generally to wireless communications and, more particularly, to systems and methods for reporting random access information to a communication network.

BACKGROUND

Wireless communication networks can include network communication devices and network communication nodes. In some instances, the network communication devices can communicate random access (RA) resources, related to a RA procedure, to the communication network.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes storing, by a wireless communication device, random access (RA) information of multiple sets of RA resource of a completed RA procedure. The method further includes receiving, by the wireless communication device from a wireless communication node, an indicator via a radio resource control (RRC) message. The method also includes transmitting, by the wireless communication device to the wireless communication node, responsive to the indicator, the RA information of the multiple sets of RA resource of the completed RA procedure.

In another embodiment, a method includes transmitting, by a wireless communication node to a wireless communication device, an indicator via a radio resource control (RRC) message. The method further includes receiving, by the wireless communication node from the wireless communication device, random access (RA) information of multiple sets of RA resource of a completed RA procedure, after the indicator is transmitted.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 4A-4M show an example of an RA information.

FIG. 5 shows an example of a parameter used to limit the number of RA resources that can be included in the RA resource list.

FIG. 6A-6M show another example of RA information.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
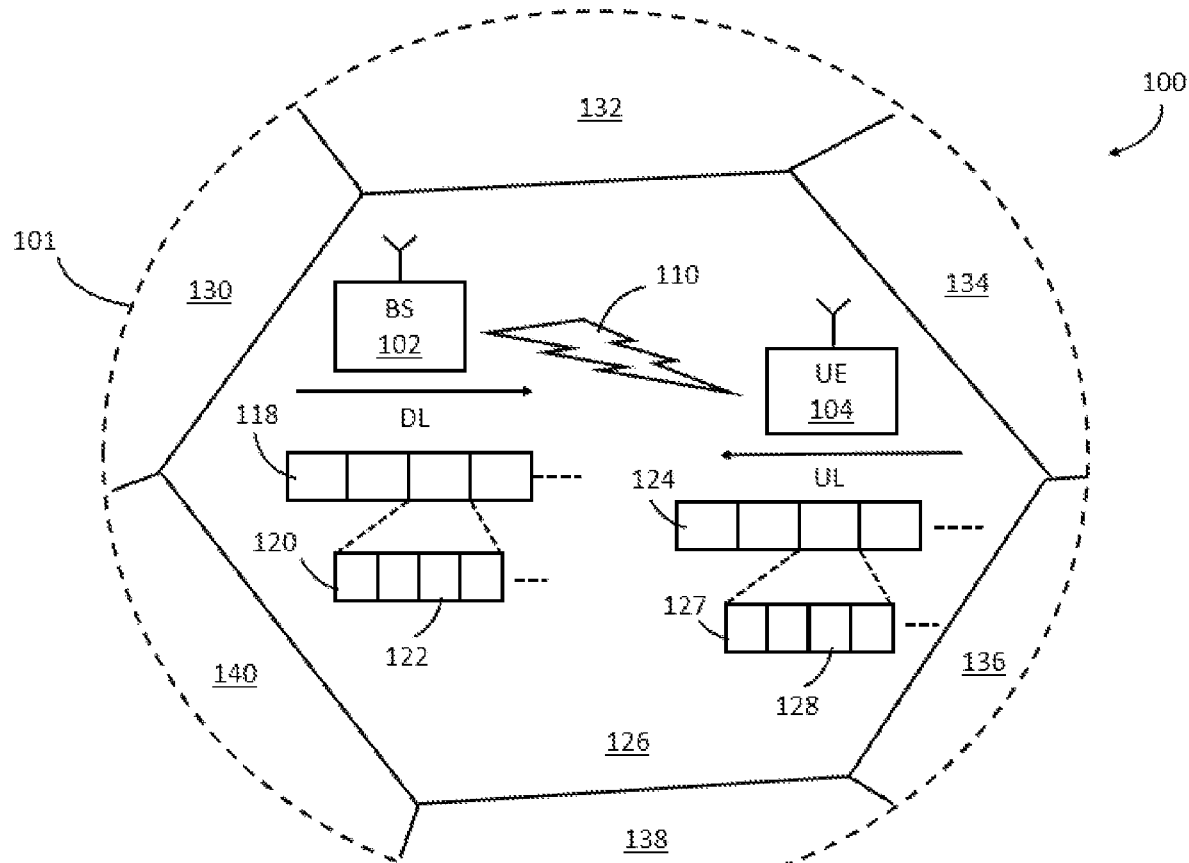
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (also referred to as "communication point 102" or "BS 102" or "transmitting receiving point (TRP)", or "communication node") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101.

In FIG. 1, the communication point 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the communication point 102 may operate at an allocated channel transmission bandwidth to provide adequate coverage to the UE 104. The communication point 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the communication point 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
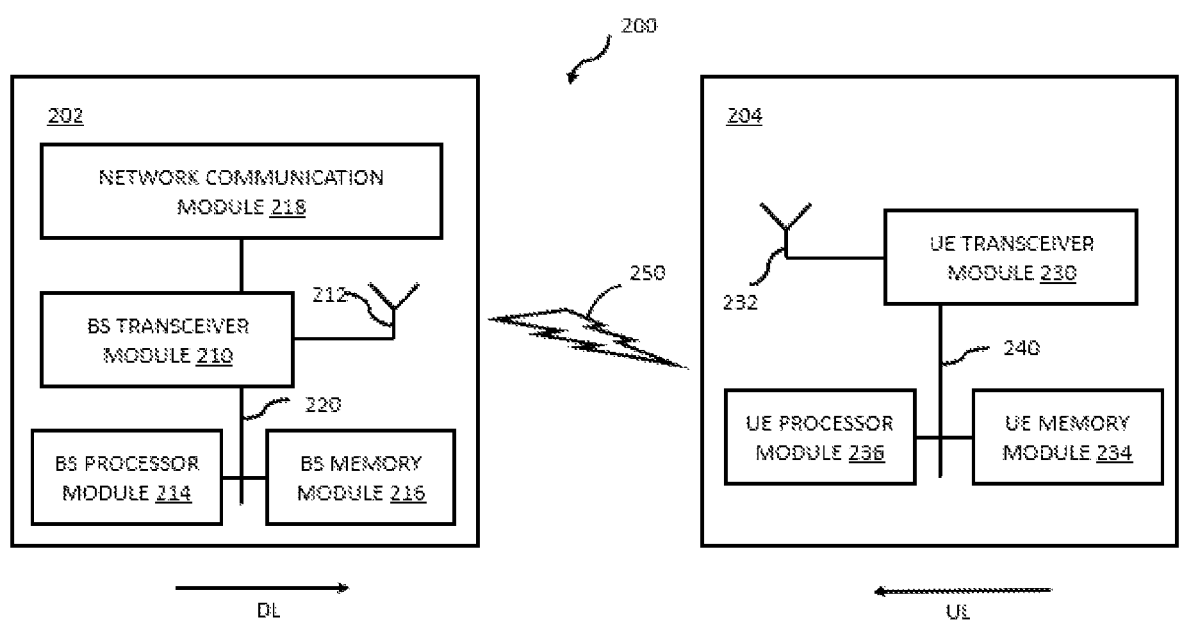
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., orthogonal frequency-division multiplexing (OFDM)/orthogonal frequency-division multiple access (OFDMA) signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (also referred to as "communication point 202") and a user equipment device 204 (hereinafter "UE 204"). The communication point 202 includes a the communication point (base station) transceiver module 210, a communication point antenna 212, a communication point processor module 214, a communication point memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The communication point 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the communication point transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the communication point 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Having discussed aspects of a networking environment as well as devices that can be used to implement the systems, methods and apparatuses described herein, additional details shall follow.

Figure 3:
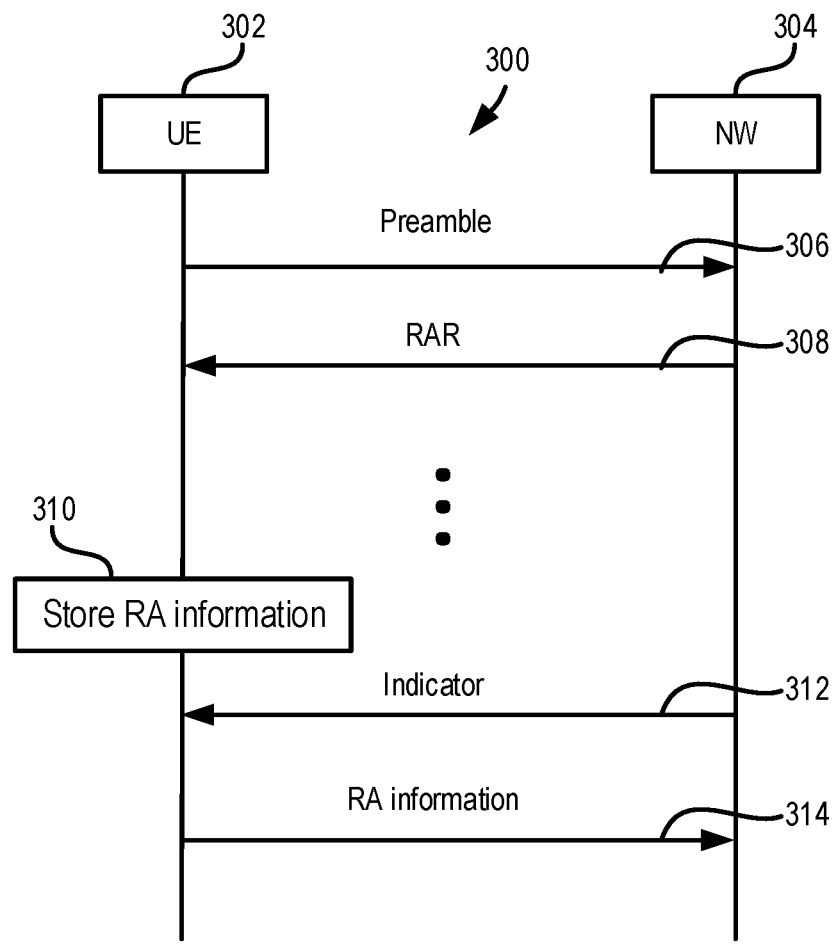
FIG. 3 shows a schematic of an example timing diagram depicting communication between a UE and a network (NW), in accordance with some embodiments of the present disclosure.

In 5G NR, a UE can gain initial access to a network by requesting a setup of a connection in a procedure commonly referred to as random access (RA). For example, when a UE is switched on, or enters a new cell, the UE can carry out a cell search and RA procedure to communicate with the network or the node associated with the new cell. The RA procedure can also be used to gain timing alignment between the network and the UE or request UL resource when there is no physical uplink control channel (PUCCH) resource for scheduling request or to perform beam failure recovery and for other purposes as specified in protocol. FIG. 3 shows a schematic of an example timing diagram 300 depicting communication between a UE 302 and a network (NW) 304. A network periodically broadcasts system information block information, which can include several parameters, such as, for example, root sequence ID, random access channel (RACH) configuration index, power offset, and initial power. The UE 302 can randomly select one preamble and transmit the preamble 306 to the NW 304. The preamble 306 can be transmitted on a RA subframe in time and resource block in frequency corresponding to a temporary identifier (RA-RNTI). In response, the NW 304 can transmit a random access response (RAR) including, for example, a temporary cell identifier (TC-RNTI), timing advance, and uplink resource grant. In some implementations, the UE and the NW can carry out a four-step exchange to establish a connection. In some such implementations, the UE, upon receiving the RAR from the NW, can transmit a radio resource control (RRC) connection request, where in some example the first 48 bits of the RRC message sent can be used as the contention resolution identity. In a contention based communication, two or more UEs may use the same preamble to request communication with the NW. In such instances, the NW can transmit an identity, which the UEs can match with the contention resolution identity. If there is a match, the contention is resolved successfully. However if there is no match, the UE can assume that the contention resolution failed, and restart the process by resending the preamble.

In some implementations, the UE and the NW can carry out a two-step exchange to perform RACH. In such implementations, the UE can send the preamble together with a physical uplink shared channel (PUSCH) payload in the first message, e.g. MsgA, to the NW. In response to the first message received, the NW can send back a second message, e.g., MsgB to the UE. The contention resolution at UE's side in 2-step RA is performed together with the reception of MsgB. If both the preamble and the PUSCH payload in MsgA are successfully decoded, the NW can send a success-RAR message to the UE with a contention resolution ID. The UE, in turn, can assume that the RA is successfully completed if the contention resolution ID is matched with that included in the MsgA. If only the preamble part of MsgA is successfully decoded, the NW can send a fallback-RAR message to the UE, which can then fall back to the four-step RACH to resolve the contention and establish connection with the NW.

Once the UE complete the RA procedure, UE could store the related RA information and the NW may request the UE to provide the NW with a report including RA related information. For example, the UE may utilize one or more procedures to transmit the RA related information to the NW, the procedures including, for example, a RA report, a RLF (radio link failure) report, a connection establishment failure (CEF) report, etc. Traditional approaches to reporting RA related information allow the reporting of information related to only one set of RA resources used to perform the RA procedure. This information when received by the NW may be insufficient in providing an adequate assessment of all the resources used by the UE to perform the RA procedure.

The following discussion provides a technical solution to the above mentioned problem of the limited RA information being provided to the NW. In particular, as discussed below, the UE can store one or more sets of RA resource information in memory. In response to receiving an indicator from the NW, the UE can transmit the stored one or more sets of RA resource information to the NW.

Referring again to FIG. 3, the UE can store (310) one or more sets of RA information in memory at the UE. The NW can then transmit an indicator 312 to the UE. The indicator can indicate to the UE that the NW has requested RA information. Or in other examples, the indicator can indicate to the UE that NW has requested a report that might optionally include RA information. In some implementations, the NW can transmit a dedicated or a broadcast RRC message (e.g., UEInformationRequest message), which can include a request bit, to the UE. In response to receiving the indicator, the UE can transmit (314) the stored one or more sets of RA information to the NW. In some implementations, the UE can transmit the RA information to the NW over a dedicated RRC message, such as, for example, a UEInformationResponse message. However, the messages discussed above are only examples, and the NW and UE can communicate the request and the RA information over other communication messages or formats. In some examples, the UE can transmit the RA information to the NW in the form of a report. For example, the UE can transmit a RA report that includes one or more RA entry, where each entry can include RA information related to successful completion of a RA procedure. In some other examples, the UE can send RA information related unsuccessful RA procedures to the NW in a RLF report or a connection establishment failure (CEF) report. In yet another example, the RA report can include RA information regardless of whether the RA procedure was successfully or unsuccessfully completed. In some implementations, the NW or the communication protocol can define a maximum number of RA entries in the RA reports transmitted by the UE.

The RA information can include at least one of the parameters listed below: one or more sets of RA resources used during an RA procedure, preamble group indication, time related information, RA type indicator (which can indicate whether the RA information stored is related to a two-step or a four step RA procedure), RA purpose (which can indicate triggering events of the RA procedure), absolute frequency of the reference resource block (e.g., common RB 0, absoluteFrequencyPointA), bandwidth part (BWP) related information, contention detection information per RA attempt, beam related information, and the index of RA resource set used per successive RA attempt in the same beam. In some implementations, the RA information can also include additional information such as, for example, other RA parameters that are specified by the communication protocol.

(1) Parameters of One or More Sets of RA Resources Used During ONe RA Procedure

As mentioned above, the RA information can include a parameter field that includes parameters of one or more sets of RA resources used during one RA procedure. Each set of RA resources can include at least one of the parameters discussed below. For each set of RA resources, a resource set identifier can be included (in some example a resource set identifier can also be referred to as a resource set index), which can be used to identify different RA resource sets used in one RA procedure. For each set of RA resources, a starting frequency of a physical random access channel (PRACH) also can be included. The starting frequency parameter can indicate an offset of a lowest PRACH transmission occasion in the frequency domain with respect to physical resource block (PRB) 0, which is the lowest PRB of the bandwidth part (BWP) in which the RA resource is located. For each set of RA resources, a number of PRACH transmission occasions frequency-division multiplexed (FDMed) at a time instance also can be included. For example, a value of the parameter prach-FDM can be included. For each set of RA resources, a sub-carrier spacing (SCS) of the PRACH also can be included. For example, a value of the parameter prach-SubcarrierSpacing can be included. For each set of RA resources, a PRACH configuration index can also be included. The PRACH configuration index (e.g., prach-ConfigurationIndex) parameter can specify the type of preamble format is used and at which system frame and subframe UE transmits the PRACH preamble.

For each set of RA resources, a power ramping step for PRACH (e.g., powerRampingStep) value also can be included. The power ramping step of PRACH can specify the incremental increase (e.g., in dB) in the PRACH power by the UE each time the UE retries the PRACH procedure. For each set of RA resources, a backoff indicator also can be included. The backoff indicator can indicate a time delay region between a PRACH attempt and the next PRACH attempt. For each set of RA resources, a resource type also can be included. The resource type can indicate the usage of the RA resource, where the RA resource type can include at least one of: contention based RA, contention free RA, beam failure recovery (BFR), on demand system information (SI) request, 2-step contention based RA, 2-step contention free RA, 4-step contention free RA, 4-step contention based RA, common, or dedicated. In some examples, the RA resource type can be used to identify the RA resource configured. For each set of RA resources, RA prioritized parameters can also be included. In some implementations, the RA prioritized parameters can be used by the UE to select a particular set of RA resources. The RA prioritized parameters can include, for example, power ramping step used for prioritized random access procedure (e.g., powerRampingStepHighPriority for handover or for BFR) or a scaling factor for the backoff indictor for the prioritized random access procedure (e.g., scalingFactorBI for handover or BFR). In some implementation, an indicator can be used to indicate whether the RA prioritized parameter is configured for a particular resource set. For example, a "0" can indicate that no RA prioritized parameters are provided for a particular set of RA resources, and a "1" can indicate that RA prioritized parameters are provided for the particular set of RA resources. In some implementations, the inclusion of the RA prioritized parameter can be indicated by the presence of an RA prioritized bit, and the absence of such a bit can indicate that the RA prioritized parameters is not used in the corresponding set of RA resources.

In some implementations, for one RA procedure, the UE can include detailed information of one RA resource set with one or more above parameters per successive RA attempt within the same beam (channel state information—reference signal (CSI-RS), or synchronization signal and physical broadcast channel (SSB)) to indicate the RA resource being used for each successive RA attempt. In some implementations, for one RA procedure, the UE can include detailed information of one or more RA resource sets with an identifier (e.g., RA resource index) to identify each RA resource set being used in RA procedure. The UE can indicate the RA resource being used per successive RA attempt by setting the corresponding identifier (e.g., RA resource index) per successive RA attempt in the same beam (CSI-RS or SSB).

For the introduction of multiple RA resource, the following alternatives can be considered:

1. A list of RA resource. Optionally, for each RA resource, there can be an information element (IE) to indicate the usage of the RA resource. For example, an IE can used to indicated the RA resource type as mentioned in above description to indicate the usage of each RA resource.

2. Separate IE can be used for different type of RA resource instead of a list (e.g. have separate IE for RA resource for 4-step CBRA, RA resource for 4-step CFRA, RA resource for 2-step CBRA, RA resource for 2-step CFRA. And different RA resource for different usage have different IE name. In some example, the IE name can be used to identify the usage of the RA resource. In some examples, the common part of the RA resource can be included in a common IE while the IE of the additionally included RA resource set (e.g., RA resource other than first RA resource included) can include the parameters that are different from the parameters of the first RA resource. For other parameters that are not include in the IE of the additionally included RA resource set, the value defined in the common IE will be used. For example, if the common RA resource IE includes three parameters: PRACH FDMed in one time instance (e.g.,msg1-FDM), frequency start of PRACH, (e.g.,msg1-FrequencyStart) and SCS of PRACH (e.g.,msg1-SubcarrierSpacing), and a second RA resource is used (e.g., dedicated RA resource) and only msg1-SubcarrierSpacing is different from that defined in common RA resource, then the dedicated RA resource IE will only include the msg1-SubcarrierSpacing, and the value of msg1-FDM and msg1-FrequencyStart defined in common RA resource IE will be reused for dedicated RA resource, respectively.

To associate the RA resource and RA transmission attempt, the following alternatives can be considered:
1. introduce a RA resource ID or index in the RA report for each RA transmission attempt or for each successive RA transmission attempt in the same beam (CSI-RS or SSB).
2. introduce a RA type (e.g. CBRA, CFRA, or, 4-step CBRA, 4-step CFRA, 2-step CBRA, 2-step CFRA) for each RA transmission attempt or for each successive RA transmission attempt in the same beam (CSI-RS or SSB).
3. introduce a separate RA attempt list for each RA resource.
(2) Preamble Group Indication.

As mentioned above, the RA information can include a preamble group indication. The preamble group indication can be used to indicate the preamble group from which the preamble is selected. The preamble group indication can be set per RA attempt or per RA procedure. In some implementations, a one bit indication can be used to indicate whether the preamble used in the particular RA attempt is selected from group B. For instance, a "0" can indicate that the preamble is selected from group B, and a "1" can indicate otherwise, or vice versa. In some implementations, the inclusion of the preamble group indication itself can indicate that the preamble is selected from group B, and where the absence of the preamble group indicator can indicate that the preamble is selected from group A instead, or vice versa. In some implementations, the preamble group indication indicates whether a preamble used in an RA attempt is selected from a specific preamble group. That is, for example, the preamble group indicator can be selected from one of two values: groupA or groupB. The preamble group indicator can be optionally included when the preamble of group B is configured.
(3) Time Related Information As mentioned above, the RA information can include time related information. Time related information could be used by the NW to determine when the RA procedure occurred. In one implementation, the time related information can include the time when the RA procedure is initiated. For example, the UE can record the absolute time at the end of the first preamble transmission during one RA procedure for a 4-step RA or the absolute time at the end of the first PUSCH payload transmission in a 2-step RA. Alternatively, in some implementations, the time related information can include the time when the UE considers the RA procedure to be complete as per the communication protocol. Alternatively, in some implementations, the time related information can include the amount of time to complete the RA procedure. In some implementations, a combination of one or more of the above examples can be included in the time related information. For example, the time related information can include a combination of the time when the RA procedure is initiated and the time when the UE considers the RA procedure to be complete, or a combination of the time when the RA procedure is initiated and the amount of time to complete the RA procedure, or a combination of the time when the UE considers the RA procedure to be complete and the amount of time to complete the RA procedure.
(4) RA Type Indicator As mentioned above, the RA information can include a RA type indicator. The UE can use the RA type indicator to indicate whether the RA information corresponds to a two-step or a four-step RA procedure. In some implementations, the RA type indicator can be a one-bit indicator, such as for example, where a bit value of "0" can indicate a two-step RA procedure, and a bit value of "1" can indicate a four step RA procedure. In some other implementations, RA indicator can include a two-step RA procedure indicator, the presence of which can indicate the use of a two-step RA procedure, and the absence of which can indicate the use of a four-step procedure. In some implementations, the RA indicator can have values such as "1 RA" or "2 RA" indicating a two-step RA procedure or a four-step RA procedure, respectively.
(5) RA Purpose.

As mentioned above, the RA information can include a RA purpose information, which can indicate the event that triggered the UE to perform the RA procedure. The RA purpose information can include one or more of the following list of events: initial access from RRC_IDLE state, RRC Connection Re-establishment procedure, downlink (DL) or uplink (UL) data arrival during the RRC_CONNECTED state when the UL synchronization status is "non-synchronized," UL data arrival during the RRC_CONNECTED state when there are no Physical Uplink Control Channel (PUCCH) resources for Scheduling Request (SR) is available, SR failure, Request by RRC upon synchronization configuration (e.g., a handover), a transition from an RRC_INACTIVE state, to establish time alignment for a secondary timing advance group (TAG), Msg3 based SI request, MSg1 based SI request, and Beam failure recovery. It should be noted that the above list is not exhaustive or exclusive, and other events not listed above also can trigger the UE to perform the RA procedure, and the UE can include the identity of such events in the RA purpose information.
(6) BWP Related Information.

As mentioned above, the RA information can include BWP related information. The BWP related information can include at least one of the following information: frequency domain location and bandwidth of the BWP associated with the RA resources used, or the SCS of the BWP associated with the RA resources used.
(7) Beam Related Information.

As mentioned above, the RA information can also include beam related information. The beam related information can indicate whether the Reference Signal Received Power (RSRP) of the selected beam is above a configured threshold value per RA attempt. The beam related information also can include the beam type, which can be selected from the SSB or the CSI-RS. The beam information also can include a beam index or a number of preambles sent per beam.

FIG. 4A-FIG. 4M discuss an example of a RA information. In particular, FIG. 4A-FIG. 4M show the contents of an RA information in the abstract syntax notation one (ASN. 1) object identifiers. It should be noted that this is only an example notation, and other notations also may be used. Also the parameter names shown below are merely examples, and different terminology can be used to indicate similar meaning of the parameters. For example the prach-FrequencyStart, prach-FDM and prach-SubcarrierSpacing parameters shown below might also be referred to as msg1-

FrequencyStart, msg1-FDM and msg1-SubcarrierSpacing, respectively, in other examples.

Various parameters in the ASN.1 notation above have been highlighted (bold and italicized) to indicate examples of the various parameters discussed above. As an example, an information element (IE) list is used to include multiple RA resources utilized in one RA procedure, where each entry in the list includes information related to one set of RA resources. For example, the set of RA resources can include starting frequency of the PRACH transmission (prach-FrequencyStart-r16), the SCS of the PRACH (prach-SubcarrierSpacing-r16), the PRACH frequency division multiplexed (FDM) (prach-FDM-r16), among other parameters. One RA resource index is used to identify each set of RA resources.

Table 1 below provides descriptions of one or more terms used in the RA information example reproduced above.

TABLE 1

RA-Report field descriptions absoluteFrequencyPointA
This field indicates the absolute frequency position of the reference resource block (Common RB 0).
cellID
This field indicates the cell global identity (CGI) of the cell in which the associated random access procedure was performed.
contentionDetected
This field indicates whether contention was detected for the transmitted preamble in the given random access attempt.
csi-RS-Index
This field indicates the CSI-RS index corresponding to the random access attempt.
dlRSRPAboveThreshold
This field indicates whether the DL beam (SSB or CSI-RS) quality associated with the RA attempt was above or below a threshold (e.g., rsrp-ThresholdSSB when NUL is used and rsrp-ThresholdSSB-SUL when SUL is used).
locationAndBandwidth
Frequency domain location and bandwidth of the BWP associated with the RA resources used by the UE.
numberOfPreamblesSentOnCSI-RS
This field indicates the total number of successive RA preambles that were transmitted on the corresponding CSI-RS.
numberOfPreamblesSentOnSSB
This field is indicates the total number of successive RA preambles that were transmitted on the corresponding SSB/PBCH (physical broadcast channel) block.
prach-FDM
The number of PRACH transmission occasions FDMed in one time instance. (see, for example, 3GPP Specification No. TS 38.211, clause 6.3.3.2).
prach-FrequencyStart
Offset of the lowest PRACH transmission occasion in frequency domain with respect to PRB 0 of the UL BWP.
prach-SubcarrierSpacing
Subcarrier spacing of PRACH resources.
ra-ResourceList
This field is provides the list of RA resources used by the UE for a completed RA procedure. The number of RA resource can be reported is up to maxRAResource.
perRAAttemptInfoList
This field provides detailed information about a RA attempt.
perRAInfoList
This field provides detailed information about each of the RA attempts in the chronological order.
perRACSI-RSInfoList
This field provides detailed information about the successive RA attempts associated with the same CSI-RS.
perRASSBInfoList
This field provides detailed information about the successive RA attempts associated with the same SS/PBCH block.
ra-Resource-Index
This field identifies the RA resource being used in the successive RA attempts associated with the same CSI-RS or SS/PBCH block.
raPurpose
This field indicates the RA scenario for which the RA report entry is triggered. The RA accesses associated with Initial access from TABLE 1-continued RA-Report field descriptions RRC_IDLE, transition from RRC-INACTIVE and the MSG3 based SI request are indicated using the indicator 'accessRelated'.
ssb-Index
This field indicates the SS/PBCH index of the SS/PBCH block corresponding to the RA attempt.
subcarrierSpacing
Subcarrier spacing used in the BWP associated with the RA resources used by the UE.

Upon completion of the RA procedure, the UE can include the detailed information of one or more sets of RA resources being used in the RA procedure. The UE can include the RA resource index for each successive RA attempt in the same beam (SSB or CSI-RS) to indicate the corresponding RA resource being used, and where the RA resource index can indicate the detailed set of RA resource information.

In some examples the RA resource index parameter (e.g., ra-Resource-Index-r16 as described above) is conditionally presented. For example, the RA resource index parameter is mandatory presented when there is more than one RA resource included in RA resource list (e.g., ra-ResourceList-r16 as described in above example). Otherwise the RA resource index parameter is absent. And the absence of the RA resource index parameter means the first RA resource included in RA resource list is used for the RA attempt.

In another example, the identifier to identify each set of RA resource configured can be an indicator for RA resource type, e.g., ra-ResourceType-r16, instead of RA resource index parameter as mentioned above. For example, the RA resource type can be selected between contention based RA (CBRA) or contention free RA (CFRA), and UE will set the field ra-ResourceType-r16 to CBRA or CFRA based on the type of RA resource used for each successive attempt in the same beam.

In some examples, the maximum number of RA resources can be pre-defined in protocol. Or a parameter (e.g, maxRAResource) can be used to limit the number of RA resources that can be included in the RA resource list. An example notation (in ASN.1) of this parameter is shown in FIG. 5. It should be noted that this is only an example notation, and other notations also may be used.

FIG. 6A-FIG. 6M show another example of RA information in ASN.1. In this example separate IE is used to indicate different RA resource used in a RA procedure. In this example, the UE can indicate the RA resource associated with each RA attempt by setting the RA resource type per successive RA attempt in the same beam. It should be noted that this is only an example notation, and other notations also may be used. Also the parameter name shown in FIG. 6A-FIG. 6M are merely examples, and that different terminology can be used to indicate similar meaning of the parameters.

Various parameters in the ASN. 1 notation in FIG. 6A-FIG. 6M have been highlighted (bold and italicized) to indicate examples of the various parameters discussed herein. Table 2 below provides descriptions of one or more terms used in the RA information example reproduced above.

TABLE 2

RA-Report field descriptions msg1-FDM
The number of PRACH transmission occasions FDMed in one time instance. (see, for example, 3GPP Specification No. TS 38.211, clause 6.3.3.2).
msg1-FrequencyStart
Offset of the lowest PRACH transmission occasion in frequency domain with respect to PRB 0 of the UL BWP.
msg1-SubcarrierSpacing
Subcarrier spacing of PRACH resources.
ra-ResourceCommon
This field provides detailed information of the common RA resource, i.e., resource configured for contention based RA, if used in the RA procedure.
ra-ResourceDedicated
This field provides detailed information of the dedicated RA resource, e.g., resource configured for contention free RA or for BFR or for on-demand SI request, if used in the RA procedure.
ra-ResourceType
This field identifies the RA resource being used in the successive RA attempts associated with the same CSI-RS or SS/PBCH block. If common RA resource is used, this field is set to common otherwise is set to dedicated. This field is optionally present, absence of this field indicates there is only one RA resource (either common or dedicated) is used in the RA procedure.

Table 3 below describes the multiRA condition mentioned above.

TABLE 3

| Conditional Presence | Explanation |
| --- | --- |
| multiRA | The field is mandatory presented when corresponding report (RA-Report or RLF-Report) includes more than one RA resource. Otherwise this field is absent. |

In another example, an indicator to differentiate whether this RA attempt is CB based or CF based can be introduced. For example, a bit indicator can be used, "0" means RA attempt is CB based while "1" means it is CF based, or vice versa. Or in another example, the presence of such indicator indicates that the RA attempt is CF based, and absence of such indicator indicates that the RA attempt is CB based or vice versa. In another example, the above mentioned indicator can be set per successive RA attempt within the same beam. If an indicator to differentiate the RA attempt type (e.g. CB based or CF based) is used, the RA resource type indicator as mentioned in the above example might not be needed. And the RA resource used per RA attempt or per successive RA attempt within the same beam can be implicitly indicated by the indicator. For example, if the indicator indicates that the RA attempt is CB based, then the RA resource used in the corresponding attempt is common RA resource, otherwise the RA resource used is dedicated RA resource.

In some examples, the parameters included in the first IE of RA resource (e.g., msg1-FDM, msg1-FrequencyStart and msg1-SubcarrierSpacing as defined in above example) are mandatorily present, and the parameters included in additionally included IE of RA resource are optionally present, i.e., the parameter is included if the value is different from that defined in the first RA resource IE. For those parameters that are not included in the additionally included RA resource IE, the same values as defined in the first RA resource IE can be reused. For example, if the common RA resource IE includes three parameters: msg1-FDM, msg1-FrequencyStart and msg1-SubcarrierSpacing, and a second RA resource is used (e.g., dedicated RA resource) and only msg1-SubcarrierSpacing is different from that defined in common RA resource, then the dedicated RA resource IE will only include the msg1-SubcarrierSpacing, and the value of msg1-FDM and msg1-FrequencyStart defined in common RA resource IE will be reused for dedicated RA resource, respectively.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
storing, by a wireless communication device, one or more sets of random access (RA) information, each RA information of the one or more sets of RA information corresponding to respective different RA procedures, wherein at least one RA information of the one or more sets of RA information corresponds to a respective completed RA procedure and includes multiple sets of RA resources of the completed RA procedure;
receiving, by the wireless communication device from a wireless communication node, an indicator via a radio resource control (RRC) message; and
transmitting, by the wireless communication device to the wireless communication node, responsive to the indicator, the one or more sets of RA information.

2. The method of claim 1, wherein each RA attempt of the completed RA procedure utilized one of the multiple sets of RA resources.

3. The method of claim 1, wherein the RA information includes a resource set identifier.

4. The method of claim 1, wherein the RA information includes a starting frequency of a physical random access channel (PRACH).

5. The method of claim 1, wherein the RA information includes a number of physical random access channel (PRACH) transmission occasions frequency-division multiplexed at a time instance.

6. The method of claim 1, wherein the RA information includes a subcarrier spacing of a physical random access channel (PRACH).

7. The method of claim 1, wherein the RA information includes at least one of: a physical random access channel (PRACH) index, a power ramping step for a PRACH, a backoff indicator, a resource type, or a RA prioritized parameter.

8. The method of claim 7, wherein the resource type identifies a set of RA resources being used for a RA attempt.

9. The method of claim 1, further comprising transmitting, by the wireless communication device to the wireless communication node, the one or more sets of RA information via at least one information element.

10. The method of claim 1, wherein the RA information includes an index of a set of RA resources utilized in a successive RA attempt in a same beam.

11. The method of claim 1, further comprising transmitting, by the wireless communication device to the wireless communication node, responsive to the indicator, an indication of a preamble group associated with the completed RA procedure.

12. The method of claim 11, wherein the indication indicates whether a preamble used in an RA attempt is selected from a specific preamble group.

13. The method of claim 11, wherein presence of the indication transmitted to the wireless communication node indicates that a preamble used in an RA attempt is selected from a specific preamble group, and absence of the indication indicates that the preamble used in the RA attempt is not selected from the specific preamble group.

14. The method of claim 11, wherein absence of the indication indicates that a preamble used in an RA attempt is selected from a predefined preamble group.

15. The method of claim 1, further comprising transmitting, by the wireless communication device to the wireless communication node, responsive to the indicator, time-related information of the completed RA procedure.

16. The method of claim 15, wherein the time-related information is indicative of a time the completed RA procedure is initiated or completed.

17. The method of claim 15, wherein the time-related information is indicative of a time duration for the completed RA procedure.

18. A method, comprising:
    transmitting, by a wireless communication node to a wireless communication device, an indicator via a radio resource control (RRC) message; and
    receiving, by the wireless communication node from the wireless communication device, one or more sets of random access (RA) information, each RA information of the one or more sets of RA information corresponding to respective different RA procedures, wherein at least one RA information of the one or more sets of RA information corresponds to a respective completed RA procedure and includes multiple sets of RA resources of the completed RA procedure, after the indicator is transmitted.

19. A wireless communication device, comprising:
    at least one processor configured to:
        store one or more sets of random access (RA) information, each RA information of the one or more sets of RA information corresponding to respective different RA procedures, wherein at least one RA information of the one or more sets of RA information corresponds to a respective completed RA procedure and includes multiple sets of RA resources of the completed RA procedure;
        receive, via a transceiver from a wireless communication node, an indicator via a radio resource control (RRC) message; and
        transmit, via the transceiver to the wireless communication node, responsive to the indicator, the one or more sets of RA information.

20. A wireless communication node, comprising:
    at least one processor configured to:
        transmit, via a transceiver to a wireless communication device, an indicator via a radio resource control (RRC) message; and
        receive, via the transceiver from the wireless communication device, one or more sets of random access (RA) information, each RA information of the one or more sets of RA information corresponding to respective different RA procedures, wherein at least one RA information of the one or more sets of RA information corresponds to a respective completed RA procedure and includes multiple sets of RA resources of the completed RA procedure, after the indicator is transmitted.

* * * * *